July 17, 1962 E. T. SEAWARD ETAL 3,044,264
FUEL SPRAY NOZZLE
Filed May 11, 1960

INVENTORS
EDWARD T. SEAWARD
ROBERT E. ROSATI
BY *Vernon F. Hauschild*
ATTORNEY

United States Patent Office 3,044,264
Patented July 17, 1962

3,044,264
FUEL SPRAY NOZZLE
Edward T. Seaward, Glastonbury, and Robert E. Rosati, East Hartford, Conn., assignors to United Aircraft Corporation, East Hartford, Conn., a corporation of Delaware
Filed May 11, 1960, Ser. No. 28,422
1 Claim. (Cl. 60—39.74)

This invention relates to jet type engines of the aircraft type having afterburners and more particularly to the spray bar system used in providing fuel to the afterburner.

It is an object of this invention to provide an afterburner fuel spray bar which is capable of efficient fuel distribution and atomization over all fuel discharge pressure conditions, including the low fuel discharge pressure condition which exists during altitude flight.

It is an object of this invention to teach a spray bar utilizing a spray nozzle completely enveloped within the spray bar.

It is an object of this invention to teach a spray bar unit which is supportable from afterburners structure and which includes a longitudinal fuel passage extending for nearly the full length of the spray bar and a plurality of transverse fuel passages extending transversely thereof and which further includes a replaceable spray nozzle insert which is supportably positioned within each of said transverse passages and cooperates therewith to define a plurality of tangential swirl fuel passages immediately upstream of a convergent-divergent fuel nozzle defined by the transverse passages.

It is still a further object of this invention to teach a spray bar which utilizes a fully imbedded fuel nozzle which causes the fuel to spin in tangential fashion before passing through a convergent-divergent fuel nozzle, from which it is flung by centrifugal force and pressure drop and in atomized fashion to the afterburner interior.

It is still a further object of this invention to teach a spray bar which can be fully assembled and both flow checked and pressure checked as a subassembly before installation into the afterburner proper.

Other objects and advantages will be apparent from the specification and claims, and from the accompanying drawings which illustrate an embodiment of the invention.

Figure 1:
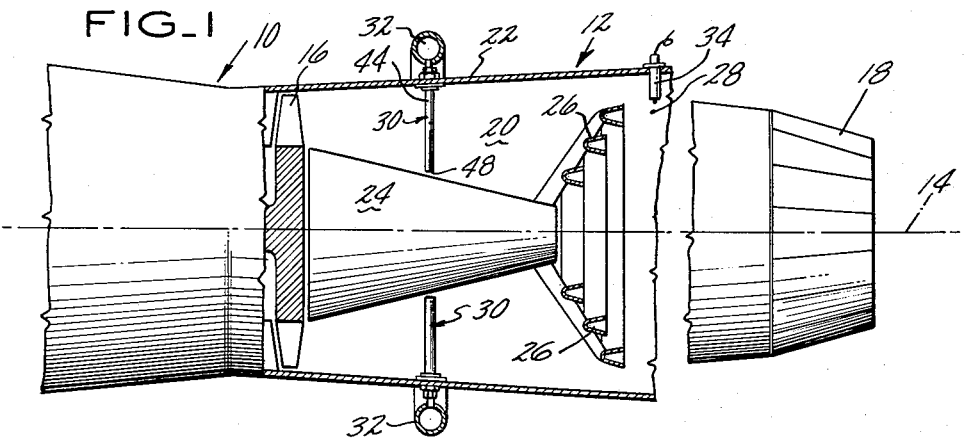
FIG. 1 is a partial showing of an aircraft jet type engine with an afterburner which is partially broken away to illustrate our invention.

Referring to FIG. 1 we see aircraft jet type engine 10 and afterburner 12, both of which are coaxial about axis 14 and with engine 10 discharging exhaust gases from turbine 16 into afterburner 12 for further burning therein and eventual discharge therefrom to atmosphere for thrust generating purposes through exhaust nozzle 18. Engine 10 is of conventional design and may be of the type fully described in U.S. Patents Nos. 2,711,631 or 2,747,367 while afterburner 12 may also be of conventional type and of the type fully described in U.S. Patents Nos. 2,846,841 and 2,846,842. Variable area exhaust nozzle 18 is conventional and may be of the type fully described in U.S. Patents Nos. 2,770,944 or 2,910,829.

With respect to combustion in the afterburner 12, the engine exhaust gases are discharged from turbine 16 into the annular exhaust gas passage 20 defined between afterburner duct 22 and inner body 24 which may be of the type fully described in U.S. Patent No. 2,865,167. The exhaust gas is passed over flameholder unit 26, which may be of the type fully described in U.S. Patent No. 2,929,211 to form a stagnation or combustion zone 28 downstream thereof. Fuel is provided to the combustion zone 28 by a plurality of radially extending sparodic circumferentially positioned spray bar units 30 which are positioned in gas passage 20 upstream of flameholder unit 26. Fuel is supplied to spray bars 30 from a fuel pump (not shown) through fuel manifold 32. The atomized fuel from spray bars 30 passes over flameholder 26 and enters combustion zone 28 in which the fuel-air mixture is ignited by any convenient means such as spark plug 34 or an ignitor of the type fully described in U.S. Patent Nos. 2,829,489 and 2,780,055.

Figure 2:
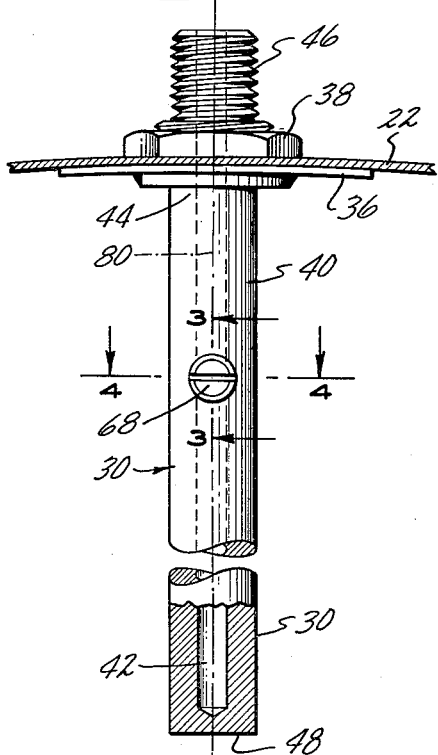
FIG. 2 is an enlarged showing of our fuel spray bar partially broken away to illustrate one of the fuel nozzles and the longitudinal and transverse passages.

Spray bar unit 30 is shown in greater particularity in FIG. 2. Spray bar unit 30 is supported from afterburner structure, for example, by attachment to afterburner duct 22 by coaction of flange 36 and nut 38 but it should be borne in mind that a part or all of the spray bar support could come from inner member 24. Spray bar unit 30 comprises cylindrical bar 40 which has longitudinal and preferably cylindrical passage 42 extending from its outer end 44 where it connects with connecting means 46, which joins longitudinal passage 42 with the fuel supply system including manifold 32 to a point near its inner end 48 so that passage 42 is a cylindrical bore type cavity extending nearly the full length of bar 40. In addition to longitudinal cavity or passage 42, spray bar unit 30 also includes at least one but preferably a plurality of spray nozzle units 48 extending transversely of bar 40 and longitudinal passage 42.

Figure 3:
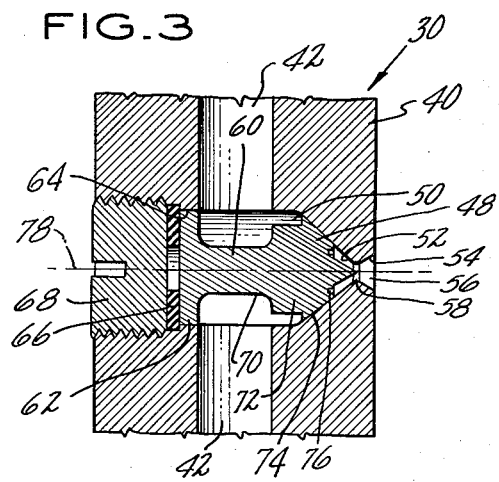
FIG. 3 is an enlarged showing of the fuel nozzle illustrated in FIG. 2.
Figure 4:
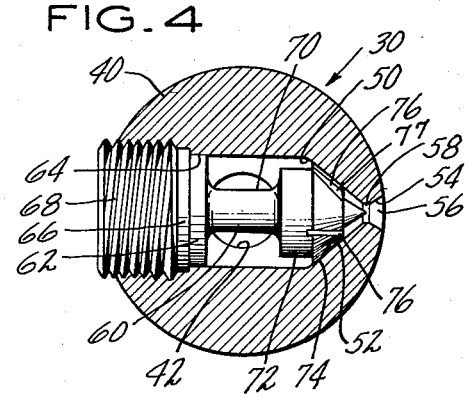
FIG. 4 is a view taken along line 4—4 of FIG. 2.
Figure 5:
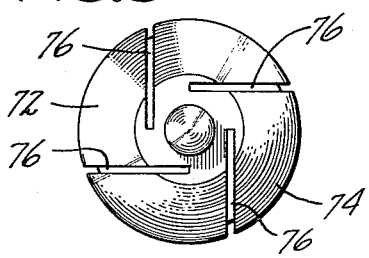
FIG. 5 is a front view of the fuel nozzle insert.

Spray nozzle unit 48 is shown in greater particularity in FIGS. 3 and 4 in which it is shown to include transverse cavity or passages 50 which communicate with longitudinal passage 42 to intercept some of the fuel passing therethrough and which includes conically convergent portion or wall 52 and conically divergent portion or wall 54 which cooperate to define a convergent-divergent fuel nozzle 56 including nozzle throat 58. Spray nozzle unit 48 also includes spray nozzle insert 60 which includes base portion 62 which is a cylindrical flange like member received in the cylindrical bore 64 of bar 40 which defines a portion of transverse passage 50 and which coacts with washer 66 and threaded insert 68, which is threadably received in bar 40, to make unit 48 removable and replaceable. Unit 48 further includes a necked down shank section 70 which is of smaller diameter than the diameter of longitudinal passage 42 so as not to completely block the passage of fuel therethrough. Unit 48 further includes head section 72 which includes convergent conical portion or wall 74 which is contoured to be snugly received by the corresponding converging conical wall 52 of transverse passage 50. Head portion 72 includes a plurality of tangentially extending swirl recesses such as 76 which cooperate with conical portion 52 to permit the fuel to move from the longitudinal passage 42 to fuel nozzle 56 with a tangential velocity sufficient to cause a mechanical break-up of the fuel into very small particles.

In operation, fuel from the fuel pump passes into longitudinal passage 42 from fuel manifold 32 and a portion thereof passes into each of the transverse passages 50 and then passes through swirl passages 77 to have a swirl imparted thereto tangential to axis 78 of fuel nozzle insert 48, which axis is perpendicular to axis 80 of longitudinal passage 42 and bar 40. After being discharged in swirling fashion from tangential passages 77, the fuel passes along convergent conical wall 52, through fuel nozzle throat 58 and then expands and increases in velocity as it swirls along the walls of divergent conical portion 54 from whence it is flung by centrifugal force and pressure drop and in atomized form to the exterior of fuel spray bar 30 and into gas passage 20 of afterburner 12. The gases intermingle with the atomized fuel to form a fuel-air mixture which is eventually burned in combustion zone 28 in the fashion previously described.

Depending upon the particular combustion characteristics of the afterburner involved, spray bar 30 may be oriented so as to have the atomized fuel discharged in any selected direction with respect to axis 14, for example, in either an upstream or a downstream direction, or any fraction between.

The fuel atomization created by the swirling and then converging action of the fuel in passing through passages 77 and convergent portion 52 and then the increase in velocity in passing through divergent portion 54 permits our fuel spray bar unit to provide efficient and effective fuel distribution at fuel pressures when, under normal operation, the pressure of the fuel in manifold 32 falls to a point where efficient fuel distribution and atomization would not be available if drilled passages are used as a means of communication between the longitudinal passages 42 and the afterburner interior.

In view of the fact that our fuel nozzle unit 48 is completely enveloped or imbedded within cylindrical bar 40, it causes no aerodynamic loss to the gases flowing through the afterburner. Further, bar 40 is made to be cylindrical since this shape provides minimum loss and directional effect upon the exhaust gases being passed thereover.

It is to be understood that the invention is not limited to the specific embodiment herein illustrated and described but may be used in other ways without departure from its spirit as defined by the following claim:

We claim:

A fuel spray bar for use in imparting fuel into a combustion chamber comprising a bar having a single longitudinal passage extending from one end thereof while terminating short of the other end thereof, means to support said bar from a combustion chamber defining structure, means to supply fuel into said longitudinal passage, and a plurality of longitudinally spaced spray nozzle units completely embedded within said bar and each including a transverse passage communicating with said longitudinal passage and the exterior of said bar and each further including a spray nozzle insert having a necked down shank section extending across said longitudinal passage and a head section connected to said shank section and extending into said transverse passage, said insert being shaped to cooperate with said longitudinal and transverse passages to define conduits to pass fuel from said longitudinal passage and through said transverse passage to an area external of said bar, and said shank section of said insert being sized to permit flow thereby for continuance through said longitudinal passage.

References Cited in the file of this patent
UNITED STATES PATENTS

| | | |
|---|---|---|
| 978,597 | Kennedy | Dec. 13, 1910 |
| 2,030,830 | Hibner | Feb. 11, 1936 |
| 2,239,068 | Wood | Apr. 22, 1941 |
| 2,321,428 | Schloz | June 8, 1943 |
| 2,605,140 | Bartling | July 29, 1952 |
| 2,607,193 | Berggren | Aug. 19, 1952 |
| 2,690,648 | Pearce | Oct. 5, 1954 |
| 2,780,915 | Karen | Feb. 12, 1957 |
| 2,865,170 | Kadosch | Dec. 23, 1958 |